(12) United States Patent
Nakano et al.

(10) Patent No.: US 8,916,992 B2
(45) Date of Patent: Dec. 23, 2014

(54) POWER GENERATING SYSTEM

(75) Inventors: Yoshinobu Nakano, Toyota (JP);
Katsunori Yai, Gifu (JP)

(73) Assignee: Aisin Seiki Kabushiki Kaisha,
Kariya-shi (JP)

( * ) Notice: Subject to any disclaimer, the term of this patent is extended or adjusted under 35 U.S.C. 154(b) by 847 days.

(21) Appl. No.: 13/164,078

(22) Filed: Jun. 20, 2011

(65) Prior Publication Data

US 2011/0316340 A1    Dec. 29, 2011

(30) Foreign Application Priority Data

Jun. 25, 2010   (JP) ................................. 2010-144505

(51) Int. Cl.
| | | |
|---|---|---|
| *H02J 3/30* | (2006.01) | |
| *H02M 5/293* | (2006.01) | |
| *H02M 5/458* | (2006.01) | |
| *H02M 1/00* | (2006.01) | |

(52) U.S. Cl.
CPC .... *H02M 5/4585* (2013.01); *H02M 2001/0009* (2013.01); *H02M 5/293* (2013.01); *H02M 5/458* (2013.01)
USPC .............................................. 307/43; 307/68

(58) Field of Classification Search
USPC ...................................................... 307/43, 68
See application file for complete search history.

(56) References Cited

U.S. PATENT DOCUMENTS

| | | | | |
|---|---|---|---|---|
| 2004/0095023 | A1* | 5/2004 | Jacobson et al. | ................. 307/80 |
| 2007/0007969 | A1* | 1/2007 | Dai et al. | ....................... 324/601 |
| 2009/0206600 | A1* | 8/2009 | Horie et al. | ........................ 290/2 |

FOREIGN PATENT DOCUMENTS

| | | |
|---|---|---|
| CH | 699 531 B1 | 3/2010 |
| JP | 63-302769 A | 12/1988 |
| JP | 08-322266 A | 12/1996 |
| JP | 2004-180356 | 6/2004 |
| JP | 2004-180490 A | 6/2004 |
| JP | 2005-328603 A | 11/2005 |
| JP | 2007-221916 | 8/2007 |
| JP | 2008-5651 | 1/2008 |
| JP | 2008-206267 A | 9/2008 |
| JP | 2008-228543 A | 9/2008 |

(Continued)

OTHER PUBLICATIONS

Extended European Search Report issued Apr. 4, 2014, in European Patent Application No. 11170578.6.

(Continued)

*Primary Examiner* — Rexford Barnie
*Assistant Examiner* — Dru Parries
(74) *Attorney, Agent, or Firm* — Oblon, Spivak, McClelland, Maier & Neustadt, L.L.P.

(57) ABSTRACT

A power generating system includes a control device, a first current detection device detecting a load alternating electric current, and a second current detection device detecting a direct current of the direct current power converted by a first converter. The control device obtains a first integrated value by integrating a direct current component corresponding to a positive electric current positioned at a positive side relative to a zero-crossing of the load alternating electric current among the direct current of the direct current power converted by the first converter and detected by the second current detection device by time, obtains a second integrated value by integrating a direct current component corresponding to a negative electric current by time, and detects a direct current component included in the load alternating electric current on the basis of a degree of a difference between the first integrated value and the second integrated value.

3 Claims, 5 Drawing Sheets

(56) References Cited

FOREIGN PATENT DOCUMENTS

| | | |
|---|---|---|
| JP | 2009-55739 | 3/2009 |
| JP | 2009-131056 | 6/2009 |
| JP | 2009-195093 | 8/2009 |
| JP | 2010-213365 | 9/2010 |

OTHER PUBLICATIONS

Matthew Armstrong, et al., "Auto-Calibrating DC Link Current Sensing Technique for Transforrnerless, Grid Connected, H-Bridge Inverter Systems", IEEE Transactions on Power Electronics, vol. 21, No. 5, XP-055108895, Sep. 1, 2006, pp. 1385-1393.

Silvio Ziegler, et al., "Current Sensing Techniques: A Review", IEEE Sensor Journal, vol. 9, No. 4, XP-011252969, Apr. 1, 2009, pp. 354-376.

Benjamin Sahan, et al., "A Single-Stage PV Module Integrated Converter Based on a Low-Power Current-Source Inverter", IEEE Transactions on Industrial Electronics, vol. 55, No. 7, XP-011229268, Jul. 1, 2008, pp. 2602-2609.

Giampaolo Buticchi, et al., "A Sensor to Detect the DC Bias of Distribution Power Transformers", Diagnostic for Electric Machines, Power Electronics & Drives (SDEMPED), 2011 IEEE, International Symposium on , IEEE, XP-032067853, Sep. 5, 2011, pp. 63-70.

Office Action issued Jan. 28, 2014 in Japanese Patent Application No. 2010-144505 (with English language translation).

\* cited by examiner

POWER GENERATING SYSTEM

CROSS REFERENCE TO RELATED APPLICATIONS

This application is based on and claims priority under 35 U.S.C. §119 to Japanese Patent Application 2010-144505, filed on Jun. 25, 2010, the entire content of which is incorporated herein by reference.

TECHNICAL FIELD

This disclosure generally relates to a power generating system which interconnects an inverter device and an alternating current commercial power source.

BACKGROUND DISCUSSION

A known power generating system for a cogeneration system is disclosed in JP2007-221916A (i.e., hereinafter referred to as Patent reference 1). The power generating system disclosed in the Patent reference 1 includes an engine driven by a combustion of a fuel, a generator actuated by the engine, a first converter converting an alternating current power generated by the generator into a direct current component, a second converter converting the direct current converted by the first converter into a alternating current power for a load (load alternating current power) and interconnected to a commercial power source as a system, and a control device controlling the first converter and the second converter. The first converter and the second converter construct an inverter device.

An alternating current of the load alternating current power outputted by the second converter of the inverter device occasionally includes a direct current component. In those circumstances, the direct current component may affect an operation of an alternating current power load connected to the inverter device. A guideline does not allow a direct current component to be included being equal to or greater than one percent (1%) of a rated current. The guideline requires to immediately disconnect (parallel off) the inverter device from the system when the alternating current of the load alternating current power outputted from the inverter device includes a direct current component equal to or greater than one percent. According to an inverter device for a small-sized cogeneration system, for example, in a case where 5 A of current is outputted when 1 kW of power is consumed, 50 mA is assumed to be a threshold value (i.e., corresponding to one percent of the rated current). In those circumstances, measurement that the alternating current of the load alternating current power includes the direct current component may be assumed to be extremely difficult. A direct current-current transformer (DC-CT) serving as an electric current sensor as an electric current detection means is moderately-priced as an electric current detection sensor. However, there is a drawback that, according to the DC-CT, a precision of measurements is likely to be affected by the temperature and a temperature drift is significant. For example, according to the DC-CT serving as the electric current sensor, there is a drawback that the temperature drift is generated because of the heat generation in use of the system, errors based on the temperature drift is added to detected values of the direct current component, and the direct current component included in the alternating current of the load alternating current power is not detected with high precision.

A need thus exists for a power generating system which is not susceptible to the drawback mentioned above.

SUMMARY

In light of the foregoing, the disclosure provides a power generating system, which includes an engine driven by a fuel, a generator actuated by the engine, an inverter device including a first converter converting an alternating current power generated by the generator into a direct current power, a second converter converting the direct current converted by the first converter into a load alternating current power and being interconnected with an alternating current commercial power source, and a gate drive circuit controlling a switching of the second converter. The power generating system further includes a control device including a control portion having a central processing unit and controlling the inverter device, a first current detection device provided at the second converter of the inverter device at a side closer to a load, the first current detection device detecting a load alternating electric current of the load alternating current power converted by the second converter, and a second current detection device provided between the first converter and the second converter of the inverter device, the second current detection device detecting a direct current of the direct current power converted by the first converter. The control device obtains a first integrated value which is calculated by integrating a direct current component corresponding to a positive electric current positioned at a positive side relative to a zero-crossing of the load alternating electric current among the direct current of the direct current power converted by the first converter and detected by the second current detection device by time, obtains a second integrated value which is calculated by integrating a direct current component corresponding to a negative electric current positioned at a negative side relative to the zero-crossing of the load alternating electric current among the direct current detected by the second current detection device by time, and detects a direct current component included in the load alternating electric current of the load alternating current power converted by the second converter on the basis of a degree of a difference between the first integrated value and the second integrated value.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
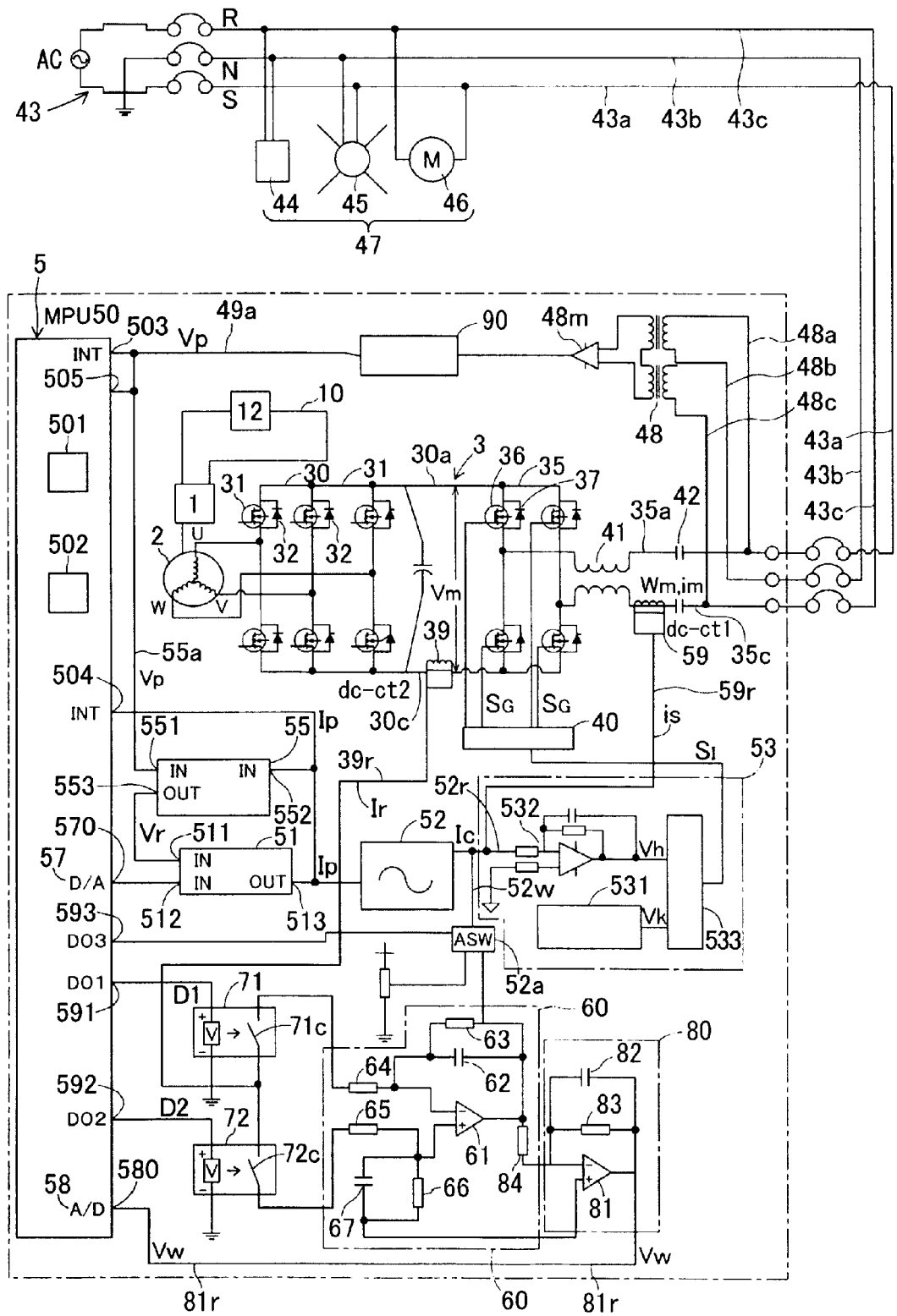
FIG. 1 is a system diagram illustrating a power generating system according to a first embodiment disclosed here.

Embodiments of a power generating system will be explained with reference to illustrations of drawing figures as follows.

An overview of the embodiment will be explained as follows. A control device obtains a first integrated value which is calculated by integrating a direct current component corresponding to a positive electric current positioned at a positive side relative to a zero-crossing of the load alternating electric current among the direct current of the direct current power converted by a first converter detected by a second current detection device by time. The control device further obtains a second integrated value which is calculated by integrating the direct current component corresponding to a negative electric current positioned at a negative side relative to the zero-crossing of the load alternating electric current by time. A degree of a difference between the first integrated value and the second integrated value corresponds to the direct current component included in the load alternating electric current of a load alternating power converted by a second converter. Thus, a control portion of the control device detects the direct current component included in the load alternating electric current of the load alternating power converted by the second converter based on the degree of the difference. An alternating voltage signal which is synchronized with the load alternating current power converted by the second converter of an inverter device and is inputted to the control portion of the control device via a transformer is defined as a timing voltage signal Vp. In those circumstances, the control portion may add an electric voltage signal based on the difference between the first integrated value and the second integrated value plural times (e.g., 10 to 200 points) for each cycle of the timing voltage signal Vp. An increase of the added number of the electric voltage signal contributes to enhance a resolution for a detection accuracy when detecting the direct current component included in the load alternating power converted by the second converter.

A power generating system according to a first embodiment will be explained with reference to FIGS. 1 and 2A-2C as follows. The power generating system includes an engine 1 driven by fuel, a generator 2 rotated by the engine 1 to generate an electric power, and an inverter device 3. Exhaust heat produced by the engine 1 is sent to an engine coolant circuit 10 to produce warm water for a device 12 which uses warm-water, for example, a heater. The inverter device 3 includes a first converter 30 which converts an alternating current power generated by the generator 2 to a direct current component and a second converter 35 which converts the direct current power converted by the first converter 30 to an alternating current power for a load (i.e., hereinafter refereed to as a load alternating current power) and interconnects an alternating current commercial power source 43 and the second converter 35 as a system. The first converter 30 includes plural first switching elements 31 converting the alternating current power generated by the generator 2 to the direct current component, and first flywheel (flyback) diodes 32. The second converter 35 is connected to the first converter 30 via wirings 30a, 30c and includes plural second switching elements 36 which converts the direct current power converted by the first converter 30 into a load alternating current power (alternating current power for a load) Wm and a second flywheel (flyback) diode 37. A direct current intermediate voltage Vm at the wirings 30a, 30c indicates a voltage at an intermediate point between the first converter 30 and the second converter 35.

A gate signal $S_G$ for turning on the second switching elements 36 of the second converter 35 is inputted into the second switching elements 36 from a gate drive circuit 40. The second converter 35 is interconnected to the alternating current commercial power source 43 via reactors 41, relays 42, the wirings 35a, 35c, and wirings 43a, 43b, 43c, or the like as a system. An indoor electric power load 47, for example, an electric power load 44, a lamp 45, and an induction motor 46, or the like, is connected to an output of the inverter device 3 and the alternating current commercial power source 43 via the wiring 43a, 43b, 43c, respectively, so that the electric power load 44, the lamp 45, and the induction motor 46 are actuated in response to the feeding of the electric power from the alternating current commercial power source 43 and the inverter device 3. Wrings 48a, 48b, 48c, each of which is connected to the alternating current commercial power source 43 and the second converter 35 are connected to a transformer 48. A first current sensor 59 (i.e., serving as a first current detection device) is provided at the wiring 35c.

According to the embodiment, a voltage signal outputted from the transformer 48 on the basis of the alternating current commercial power source 43 and the second converter 35 is inputted to a control portion 50 from a first interruption port 503 and an A/D (analog-to-digital) port 505 via an amplifier 48m and a filter 90 as a timing voltage signal VP. The timing voltage signal $V_P$ corresponds to a signal informing timings of zero-crossings of a load alternating current im of the load alternating current power Wm, which is outputted from the second converter 35 of the inverter device 3, to the control portion 50.

A controller 5 includes the control portion (MPU) 50 including a CPU, a phase locked loop circuit (PLL circuit) 51 including an output port 513 outputting a command current $I_P$, a sine wave generator 52 generating a sine wave signal based on the command current $I_P$ outputted from the output port 513 of the PLL circuit 51, a pulse-width modulation circuit (PWM circuit) 53 to which a sine wave signal $I_C$ from the sine wave generator 52 is inputted, and a phase comparator 55. The PLL circuit 51 includes the output port 513 connected to the PWM circuit 53 to output a signal to the PWM circuit 53. In a case where the timing voltage signal $V_P$ produced by transforming the voltage outputted from the second converter 35 by the transformer 48 is inputted into the control portion 50, an output frequency of the command current $I_P$ supplied from the output port 513 of the PLL circuit 51 to the PWM circuit 53 increases at a power failure of the alternating current commercial power source 43. As shown in FIG. 1, the power generating system includes an electrically conductive path starting from the PLL circuit 51 to the PWM circuit 53, the second converter 35, the transformer 48 and returning to the PLL circuit 51. The control portion 50 includes a CPU 501, a memory 502, the first interruption port 503, a second interruption port 504 to which the command current $I_P$ outputted from the output port 513 of the PLL circuit 51 is inputted as an interrupting signal, the A/D port 505, a digital-to-analog converter (D/A converter) 57 converting a digital signal to an analogue signal, and an analog-to-digital converter (A/D converter) 58 which converts the analog signal to the digital signal.

The phase comparator 55 includes a second input port 552 to which the command current $I_P$ outputted from the output port 513 of the PLL circuit 51 is inputted, a first input port 551 to which the timing voltage signal $V_P$ is inputted, and an output port 553. The phase comparator 55 compares a phase of the command current $I_P$ inputted from the second input port 552 and a phase of the timing voltage signal $V_P$ inputted from the first input port 551. In a case where the phase of the timing voltage signal $V_P$ is different from the phase of the command current $I_P$, the phase comparator 55 outputs a phase difference signal Vr which is defined proportionally to the phase difference to the input port 511 of the PLL circuit 51 in order to resolve the phase difference. The PLL circuit 51 is configured to lock a phase of the command current $I_P$ relative to a phase of the timing voltage signal $V_P$ in order to resolve the phase difference. In consequence, a phase of the command current $I_P$ outputted from the output port 513 of the PLL circuit 51 can be set to be the same phase to the phase of the timing voltage signal $V_P$. Thus, when the inverter device 3 is operated, the electric current outputted from the second converter 35 is adjusted to have the same phase to the timing voltage signal $V_P$, which is outputted from the second converter 35 or the alternating current commercial electric power 43 and inputted to the control portion 50 from the ports 503, 505 via the transformer 48, by the PLL circuit 51 and the PWM circuit 53.

The PWM circuit 53 includes a triangular wave generator 531 generating a triangular wave voltage signal $V_K$, a reference voltage generator 532 generating a reference voltage signal $V_h$ which is defined proportionally to a level (value) of electric current of the command current $I_P$, and a comparator 533 comparing the triangle wave voltage signal $V_K$ and the reference voltage signal $V_h$. The PWM circuit 53 outputs a control signal $S_I$ corresponding to the value of the electric current of the command current $I_P$ to a gate drive circuit 40. Thus, the second switching elements 36 of the second converter 35 are controlled to be ON or OFF by the gate signal $S_G$ from the gate drive circuit 40 and the second converter 35 produces the load alternating current power Wm. As shown in FIG. 1, the timing voltage signal $V_P$ is inputted to the first interruption port 503 of the control portion 50 via a wiring 49a and is inputted to the first input port 551 of the phase comparator 55 via a wiring 55a. According to the construction of the embodiment, the inverter device 3 outputs the alternating current im having the phase which is the same to the timing voltage signal $V_P$ from the second converter 35 to the indoor electric power load 47.

Further, as shown in FIG. 1, the control portion 50 of the controller 5 includes a DO1 port 591, a DO2 port 592, a DO3 port 593, and an A/D port 580 connected to the A/D converter 58. A second electric current sensor (DC-CT2) 39 serving as a second current detection device (direct current detection means) is provided at the wiring 30c arranged between the first converter 30 and the second converter 35. For example, the second electric current sensor 39 is constructed with a Hall current transformer (Hall CT) which has a possibility to generate temperature drift even though a cost is lower. The second electric current sensor 39 is configured to detect a direct current component of the direct current power which is converted by the first converter 30. The second electric current sensor 39 outputs a detection signal Ir of direct current to switching portions 71c, 72c of switching elements 71, 72. The switching element 71 turns on the switching portion 71c on the basis of a command signal D1 from the DO1 port 591 of the control portion 50. The switching element 72 turns on the switching portion 72c on the basis of a command signal D2 from the DO2 port 592 of the control portion 50.

As shown in FIG. 1, further, an integrator circuit 60 (differential integrator circuit, gain G1) is provided. The integrator circuit 60 includes a first operational amplifier 61, a condenser 62 and a resistance 63 which are connected to an output terminal and an input terminal of the first operational amplifier 61, a resistance 64 connected to the first switching portion 71c and the input terminal of the operational amplifier 61, a resistance 65 connected to the second switching portion 72c and the input terminal of the first operational amplifier 61, and a resistance 66 and a condenser 67 which are connected to the input terminal of the operational amplifier 61. An amplifier circuit 80 includes a second operational amplifier 81, a condenser 82 and a resistance 83 which are connected to an output terminal and an input terminal of the second operational amplifier 81. The output terminal of the second operational amplifier 81 is connected to the A/D converter 58 via a wiring 81r and the A/D port 580 of the control portion 50. The output terminal of the first operational amplifier 61 is connected to the input terminal of the second operational amplifier 81 via a resistance 84.

According to the construction of the embodiment, as shown in FIG. 1, a wiring 52r is provided between the sine wave generator 52 and the PWM circuit 53. The first electric current sensor 59 (DC-CT1) serving as the first current detection device is provided at the second converter 35 at a side closer to the indoor electric power load. The first electric current sensor 59 is constructed with a Hall current transfer (Hall CT) which has a possibility to generate the temperature drift although a cost is lower. The first electric current sensor 59 detects the load alternating current im of the load alternating current power Wm which is converted by the second converter 35. An alternating current signal is which is a detection signal of the first electric current sensor 59 is inputted to the wiring 52r via a signal wire 59r. The wiring 52r is connected to the integrator circuit 60 via a wiring 52w and an analog switch (ASW) 52a. The analog switch 52a is switched by a command from the DO3 port 593 of the control portion 50. The analog switch 52a is switched by the command from the DO3 port 593 of the control portion 50 before interconnecting to the commercial power source 43, and 何を is modified by a bias signal which is adjusted to be zero by a variable resistance. Thus, a drift over time and a failure of the first electric current sensor 59 at an initial stage of the energization of the first electric current sensor 59 is detectable.

Figure 2A:
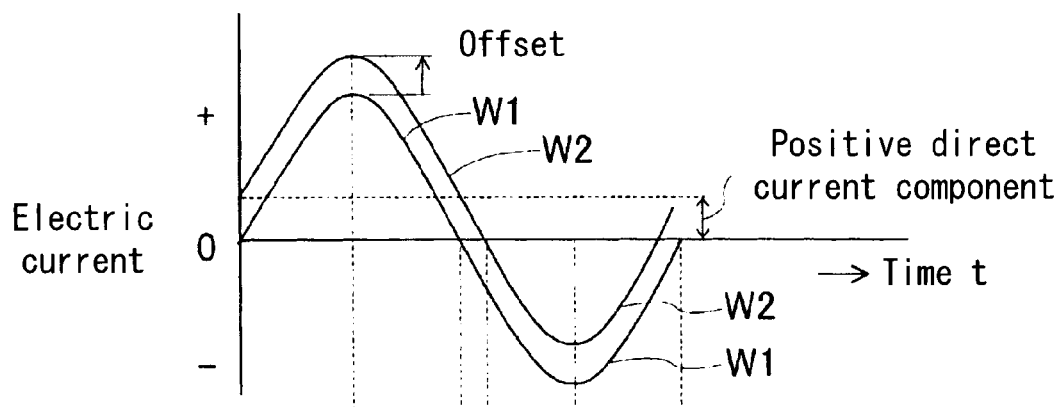
FIG. 2A shows a waveform of a load alternating current outputted from a second converter of an inverter device and detected by a first electric current sensor.

FIG. 2A shows a waveform of the alternating current im of the load alternating current power Wm which is detected as the alternating current is by the first electric current sensor 59 which is provided at the second converter 35 of the inverter device 3 closer to the indoor electric power load. That is, FIG. 2A shows the alternating current im of the load alternating current power Wm converted by the second converter 35 of the inverter device 3. As indicated with a characteristic line W1 in FIG. 2, in a case where a direct current component is not included in the load alternating current im, the load alternating current im basically shows a sine waveform and an integrated value of a positive current positioned at a positive side relative to a zero-crossing and an integrated value of a negative current positioned at a negative side relative to the zero-crossing are the same. On the other hand, as indicated with a characteristic line W2 in FIG. 2A, in a case where a positive direct current component is included in the load alternating current im, the alternating current waveform is shifted to the positive side relative to the zero-crossing, thus is offset relative to the zero-crossing. Thus, in a case where the positive direct current component is included in the load alternating current im and the load alternating current im is offset, an operation of a power load driven by the alternating current may be influenced, which is not favorable and needs to be detected at an early stage.

Figure 2B:
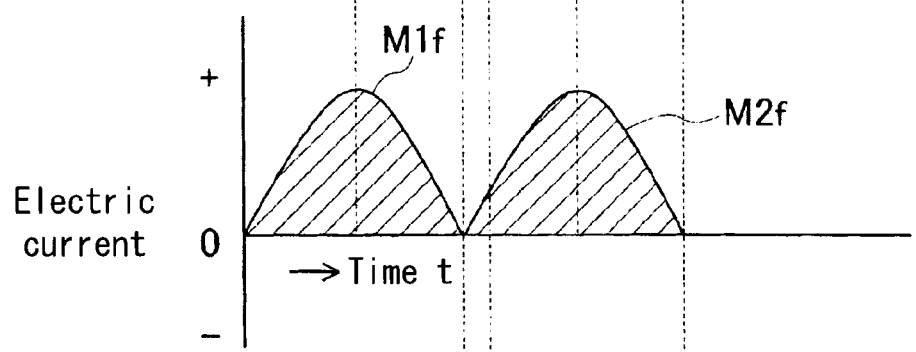
FIG. 2B shows a waveform of a direct current component outputted from a first converter of the inverter device when the load alternating current does not include the direct current component according to the first embodiment disclosed here.

FIG. 2B shows a waveform of a direct current component detected by the second electric current sensor 39 in a case where the waveform of the load side alternating current im detected by the first electric current sensor 59 is normal (i.e., not offset) as indicated with the characteristic line W1 in FIG. 2A. In a case where the waveform of the load side alternating current im is normal without offset (i.e., the direct current component is not included), as shown in FIG. 2B, the direct current component converted by the first converter 30 forms two arch shaped electric current waves M1f, M2f. The electric current waves M1f, M2f basically correspond timings and waveform formed by full-wave rectifying the alternating current signal detected by the first electric current sensor 59 to the positive side. In a case where the waveform of the load alternating electric current im is not offset and is normal (i.e., the case where the direct current component is not included), dimensions (i.e., integrated values integrated by time) of the electric current waveforms M1f, M2f shown in FIG. 2B as hatched portions are the same.

The electric current waveforms M1f, M2f are distributed by each half a cycle by commands D1, D2, respectively, from the DO1 port 591 and the DO2 port 592 of the control portion 50, a difference of the electric current integrated values of each of the half cycle is obtained by the integrator circuit 60, and the difference of the integrated values is amplified by a gain G1. The gain G1 may be set in accordance with a degree of the temperature drift of a zero signal of the first electric current sensor 59. The signal (analog signal) amplified by the degree of the gain G1 is further amplified at the amplifier circuit 80 by a gain G2, is inputted to the A/D converter 58 of the control portion 50 from the A/D port 580 of the control portion 50 via the wiring 81r, and is converted to a digital signal. Thus, the voltage signal Vw inputted to the A/D converter 58 of the control portion 50 corresponds to the difference of the integrated values of half cycles of the direct current component detected by the second electric current sensor 39 which is amplified by the multiplication of the gain G1 and the gain G2 (i.e., amplified by the gain G1 multiplied by the gain G2). As illustrated in FIGS. 2A-2B, in a case where the waveform of the load alternating electric current im detected by the first electric current sensor 59 (i.e., the alternating current outputted from the second converter 35 of the inverter device 3) does not include the direct current component, an integrated value sigma M1f (i.e., serving as a first integrated value) obtained by integrating the waveform M1f by time and an integrated value sigma M2f (i.e., serving as a second integrated value) obtained by integrating the waveform M2f by time are basically the same, and thus a difference between the integrated value sigma M1f and the integrated value sigma M2f is assumed to be zero.

Figure 2C:
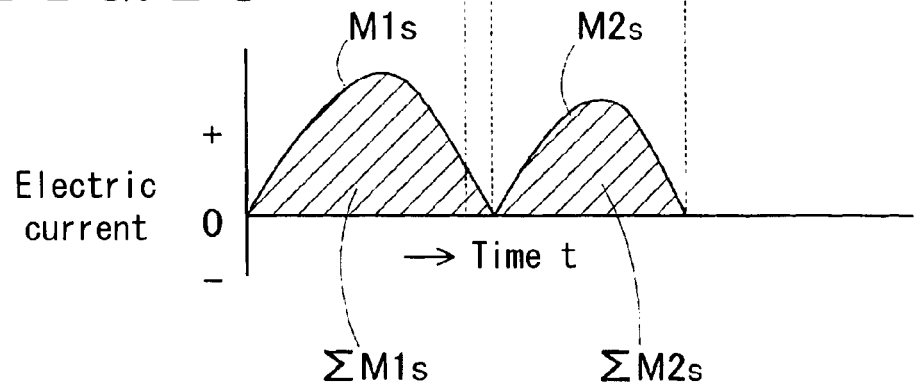
FIG. 2C shows a waveform of a direct current component outputted from the first converter of the inverter device when the load alternating current includes the direct current component according to the first embodiment disclosed here.

On the other hand, FIG. 2C illustrates a direct current component detected by the second electric current sensor 39 in a case where the waveform of the load alternating current im is offset to the positive side as indicated with the characteristic line W2 in FIG. 2A (i.e., the case where the load alternating electric current im outputted from the second converter 35 of the inverter device 3 includes the direct current component). As shown in FIG. 2C, the direct current component of the direct current power which is converted by the first converter 30 forms waveforms M1s, M2s. Thus, in a case where the alternating electric current includes the direct current component, an integrated value sigma M1s (i.e., serving as a first integrated value) obtained by integrating the waveform M1s by time and an integrated value sigma M2s (i.e., serving as a second integrated value) obtained by integrating the waveform M2s by time are basically different from each other. The absolute value of the difference between the integrated value sigma M1s and the integrated value sigma M2s (ie., $|\Sigma M1s - \Sigma M2s|$) basically corresponds to a level of the direct current component included in the load alternating electric current im.

The voltage signal Vw obtained by amplifying the absolute value of the difference of the first and integrated values by the gain G1 multiplied by the gain G2 is inputted to the A/D converter 58 of the control portion 50 from the A/D port 580 of the control portion 50 to be converted to a digital signal. The control portion 50 detects the degree (level) of the direct current component included in the load alternating electric current im of the load alternating current power Wm converted by the second converter 35 of the inverter device 3. In those circumstances, when the temperature drift is generated at the first electric current sensor 59 and the second electric current sensor 39, the temperature drift affects (influences) both of the first integrated value and the second integrated value. Accordingly, even when the temperature drift is generated at the first electric current sensor 59 and the second electric current sensor 39, the temperature drift is substantially canceled. Thus, the direct current component included in the load alternating electric current im of the load alternating current power Wm converted by the second converter 35 of the inverter device 3 is favorably detected. According to the construction of the embodiment, a sensor which generates the temperature drift is applicable as the first electric current sensor 59 and the second electric current sensor 39, and sensors with lower costs may be applicable.

The voltage signal Vw inputted from the A/D port 580 to the A/D converter 58 of the control portion 50 is assumed to have a value multiplying the difference of the integrated values of half cycles (i.e., the difference between the first and second integrated values) of the second electric sensor (DC-CT2) 39 by a gain (G1×G2). The voltage signal Vw is inputted to the control portion 50 including a CPU from the A/D port 580 via the A/D converter 58 by plural points (i.e., plural times) per a cycle of the timing voltage signal Vp (see FIG. 4) by means of a software, and are added as a digital signal at the control portion 50. For example, the voltage signal Vw is inputted to the A/D converter 58 of the control portion 50 via the A/D port 580 by 60 points for each cycle of the timing voltage signal Vp, is converted from an analog signal to digital signal (A/D conversion), and is added at the control portion 50. The number of inputting times (e.g., 60 points) is determined for detecting direct current components with adequate precision even with a lower cost CPU having an A/D converter (corresponding to the A/D converter 58) whose resolution is around 10 bit.

In those circumstances, in a case where the A/D converter whose resolution is around 10 bit is applied as the A/D converter 58 provided at the control portion 50, an electric current value applied per 1 bit is assumed to be relatively large compared to an A/D converter having greater bit and a detection of the direct current components with high precision may become difficult. For example, in a case where it is determined that the alternating current im is abnormal because a direct current component is included in the alternating current im outputted from the inverter device 3 when a direct current component to be detected exceeds a range of 50 mA (i.e., corresponding to a threshold of one percent in a case where 5 A of current is outputted when 1 kW of power is consumed) with the resolution around 10 bit, assuming the electric current value per 1 bit is approximately 20 mA, 50 mA corresponding to a threshold value falls within the range of 41 mA to 59 mA, which makes it difficult to detect the direct current component included in the alternating current im outputted from the inverter device 3.

According to the embodiment, n times (e.g., 60 times) data is added at the control portion 50 per one cycle of the timing voltage signal $V_P$. When detecting the direct electric current, the resolution increases by the added numbers of times (n times). Adding the voltage signal Vw, for example, 60 times connotes that the resolution at the control portion 50 is assumed to be 60 times greater. In those circumstances, when 60 times are added, basically, the resolution at the control portion 50 is assumed to be 20 mA/60=0.33 mA, and thus the degree of the direct current around 50 mA can be judged with the resolution being equal to or less than 1 mA. Thus, the precision for detecting that the direct current component is included in the alternating current im is enhanced even though the resolution of the A/D converter is relatively low according to the constructions of the embodiment. The added number of times (n times) is not limited to 60 times. Depending on cases, the added number of times (n times) may be determined in a range of 10-200 times, 15-100 times, or the like.

Figure 3:
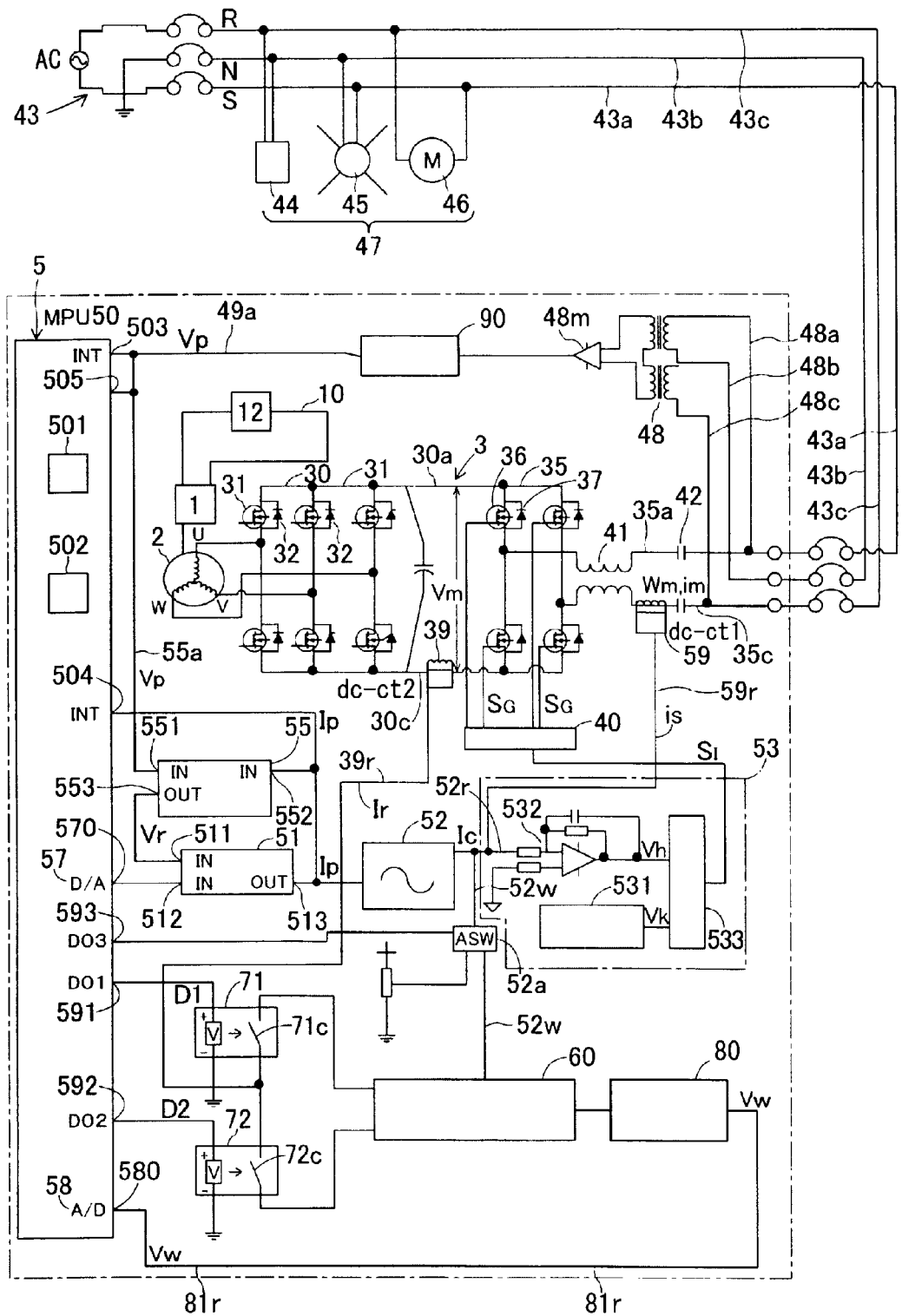
FIG. 3 is a system diagram illustrating a power generating system according to a second embodiment disclosed here.

A second embodiment will be explained with reference to FIG. 3. The basic construction of the second embodiment is common to the first embodiment, and the same advantages and effects to the first embodiment are obtained. Likewise, the waveforms and characteristics shown in FIGS. 2A-2C are applied to the second embodiment. As shown in FIG. 3, the integrator circuit 60 and the amplifier circuit 80 are provided. According to the second embodiment, likewise the first embodiment, the electric current waveforms M1f, M2f, M1s, M2s are distributed by each half cycle by the commands D1, D2, respectively, from the DO1 port 591 and the DO2 port 592 of the control portion 50, a difference of the electric current integrated values of each of the half cycle is obtained by the integrator circuit 60, and the difference is amplified by a degree of the gain G1. The gain G1 may be determined in accordance with the degree of the temperature drift of the zero signal of the first electric current sensor 59. Then, the signal (i.e., analog signal) amplified by the degree of the gain G1 is further amplified at the amplifier circuit 80 by the gain G2, inputted to the A/D converter 58 of the control portion 50 via the wiring 81r and the A/D port 580 to be converted to a digital signal. The voltage signal Vw inputted from the A/D port 580 to the A/D converter 58 of the control portion 50 corresponds to the difference of the integrated values of the half cycles (i.e., the difference of the first and second integrated values) of the direct current component detected by the second electric current sensor 39 which is amplified by the multiplication of the gain G1 and the gain G2 (i.e., gain G1×gain G2

Based on the voltage signal Vw obtained by amplifying the absolute value of the difference of the first and second integrated values by the multiplication of the gain G1 and the gain G2, the control portion 50 detects the degree of the direct current component included in the load alternating current im of the load alternating current power Wm converted by the second converter 35 of the inverter device 3. In those circumstances, the data of n times (e.g., 60 times) may be added at the control portion 50 for each cycle of the timing voltage signal Vp. When detecting the direct current, the resolution is increased by the added number of times (n times). In those circumstances, when the temperature drift is generated at the first electric current sensor 59 and the second electric current sensor 39, an error in a detected value of the direct current component due to the temperature drift influences on both of the first integrated value and the second integrated value. Thus, even when the temperature drift is generated at the first electric current sensor 59 and the second electric current sensor 39, an error in a detected value of the direct current component by the temperature drift is substantially canceled at the difference of the first and second integrated values. Accordingly, the direct current component included in the load alternating current im of the load alternating current power Wm converted by the second converter 35 of the inverter device 3 is favorably detected. As explained above, according to the constructions of the embodiment, a sensor that may generate the temperature drift is applicable as the first electric current sensor 59 and the second electric current sensor 39, and thus a manufacturing cost is reduced.

Figure 4:
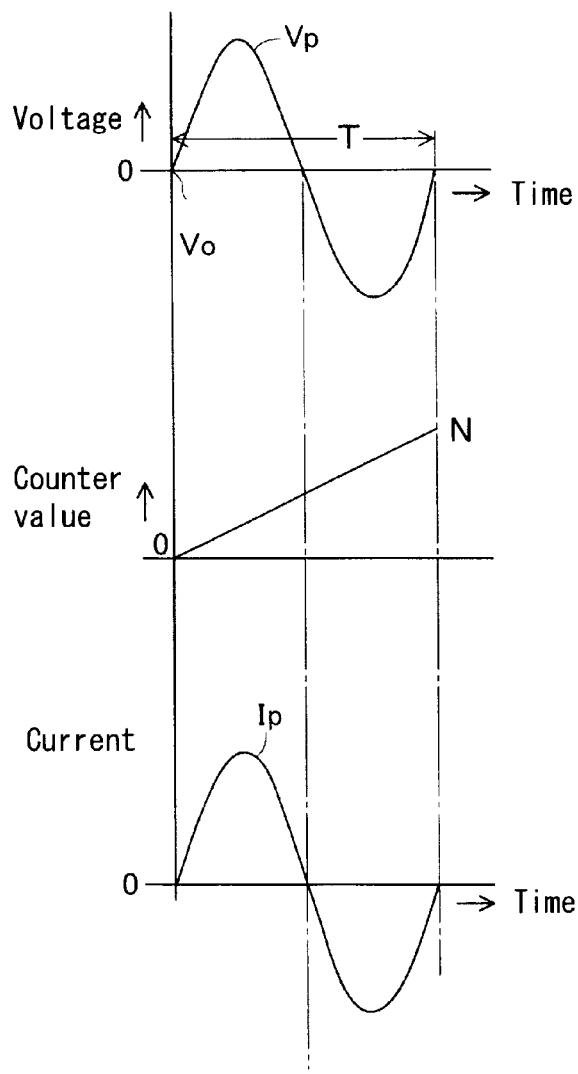
FIG. 4 illustrates waveforms of a timing voltage signal and command current according to the embodiments disclosed here.
Figure 5:
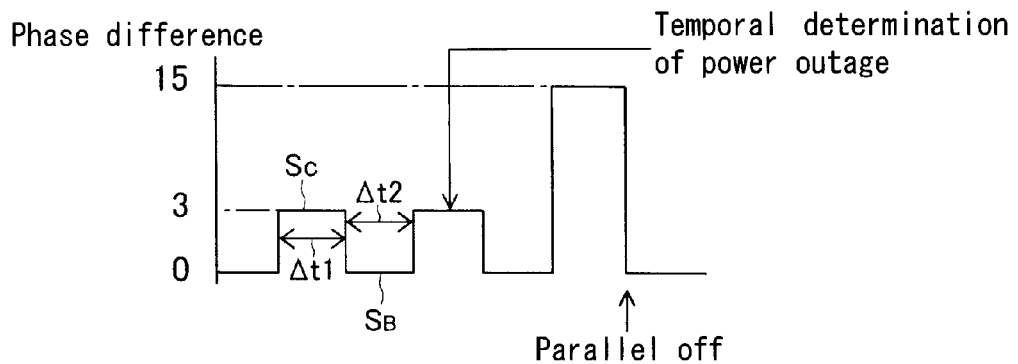
FIG. 5 is a waveform chart showing timings of a first variable and a second variable current according to the embodiments disclosed here.

Further, referring to FIGS. 4 and 5 constructions of the embodiments will be explained. The constructions shown in FIGS. 4 and 5 are applicable to the first and second embodiments, and thus are applicable to FIGS. 1 to 3. When the temperature drift is generated at the first electric current sensor 59 and the second electric current sensor 39, the temperature drift influences on both of the first integrated value and the second integrated value. Thus, even when the temperature drift is generated at the first electric current sensor 59 and the second electric current sensor 39, the temperature drift is substantially canceled. Accordingly, the direct current component included in the load side alternating current im of the load alternating current power Wm which is converted by the second converter 35 of the inverter device 3 is favorably detected. Namely, according to the constructions of the embodiment, a sensor that may generate the temperature drift is applicable as the first electric current sensor 59 and the second electric current sensor 39, and thus a manufacturing cost is reduced. According to the embodiments, a power outage of the alternating current commercial power source 43 during the inverter device 3 is in operation is detected. FIG. 4 shows a state where the timing voltage signal $V_P$ and the command current $I_P$ have the same phase as a wavelength. The timing voltage signal $V_P$ is inputted to the first interruption port 503 of the control portion 50 and includes the same phase with the phase of the load alternating current power Wm outputted from the second converter 35 of the inverter device 3 and the alternating current commercial power source 43 via the transformer 48. The command current $I_P$ is outputted from the output port 513 of the PLL circuit 51 to the sine wave generator 52. As shown in FIG. 4, a cycle T corresponding to a wavelength of the timing voltage signal $V_P$ corresponds to a counter value N (e.g., N=10000) of a counter provided at the control portion 50. Counting of the counter value N by the control portion 50 starts from a zero-crossing $V_O$ of the timing voltage signal $V_P$. For example, in a case where the phase of the command current $I_P$ relative to the phase of the timing voltage signal $V_P$ is delayed (displaced) by 90 degrees, the phase difference of 90 degrees corresponds to N/4 of the counter value. In a case where the phase of the command current $I_P$ relative to the phase of the timing voltage signal $V_P$ is delayed (displaced) by 3 degrees, the phase difference of 3 degrees corresponds to N/120 of the counter value. In a case where the phase of the command current $I_P$ relative to the phase of the timing voltage signal $V_P$ is delayed (displaced) by 15 degrees, the phase difference of 15 degrees corresponds to the N/24 of the counter value. In other words, in a case where the phase of the command current $I_P$ relative to the phase of the timing voltage signal $V_P$ is delayed (displaced) by D degree(s), the phase difference of D degree(s) corresponds to N/(360/D) of the counter value. As described above, the phase comparator 55 and the control portion 50 are configured to obtain the phase difference of the command current $I_P$ relative to the timing voltage signal $V_P$ on the basis of the counter value.

According to the embodiments, in a case where the alternating current commercial power source 43 and the inverter device 3 are interconnected with each other, the control portion 50 of the control device 5 instantaneously inputs a pulse signal $S_C$, whose pulse is in a rectangular shape (see FIG. 3), into a second input port 512 of the PLL circuit 51 from an output port 570 of the D/A converter 57 for a predetermined time $\Delta t1$ (e.g. 200 milliseconds), in order to forcibly and instantaneously displace (fluctuate) the phase of the command current $I_P$ by a first variable (e.g., by three degrees (3°)) relative to the timing voltage signal $V_P$ in a predetermined cycle (e.g. any value within a range of 10 to 2000 milliseconds), thereby intentionally generating a fluctuation to a reactive power. Accordingly, the PLL circuit 51 supplies the command current $I_P$ to the sine wave generator 52 from the output port 513 as a signal defining a phase timing. The sine wave generator 52 outputs a signal, which has a wave height value (i.e. a current value) corresponding to the direct current intermediate voltage $V_m$ of the inverter device 3, as a current command value $I_C$ while following the phase timing based on the command current $I_P$. The PWM circuit 53 compares the current command value $I_C$ and an actual current value $I_r$ inputted into the PWM circuit 53 from the current sensor 59. Then, the PWM circuit 53 outputs a current, whose phase is forcibly displaced by three degrees (3°) relative to the timing voltage signal $V_P$, to the gate drive circuit 40. Then, after the predetermined time $\Delta t1$ has elapsed, the control portion 50 of the control device 5 inputs a signal $S_B$ for adjusting the phase of the command current $I_P$ to have the same phase as the timing voltage signal $V_P$ into the second input port 512 of the PLL circuit 51 from the output port 570 of the D/A converter 57 for a predetermined time $\Delta t2$ (e.g. 200 milliseconds). Accordingly, the command current $I_P$ is adjusted to have the same phase as the timing voltage signal $V_P$.

In the case where the phase of the command current $I_P$ is forcibly displaced by three degrees (3°)) relative to the timing voltage signal $V_P$, the control portion 50 determines whether or not the phase difference of the command current $I_P$ relative to the timing voltage signal $V_P$ is actually three degrees (3°)) on the basis of the counter value. In those circumstances, while the alternating current commercial power source 43 is in a normal state (i.e. while the commercial power supply 43 does not fail), the obtained phase difference is expected to fall within a range of a threshold value corresponding to three degrees. Therefore, the control portion 50 determines that no power outage occurs at the alternating current commercial power source 43. However, in a case where the power outage occurs at the alternating current commercial power source 43, the phase difference corresponding to three degrees is not likely to be obtained, so that the phase difference falls outside of the range of the threshold value corresponding to three degrees. Accordingly, in the case where the phase difference of the command current $I_P$ relative to the timing voltage signal $V_P$ falls outside of the range of the threshold value use for the phase difference, the control portion 50 of the control device 5 temporarily determines a possibility of the power outage at the alternating current commercial power source 43. At a timing when a temporal determination of the power outage by the control device 5 is concluded, which serves as a trigger, the control portion 50 of the control device 5 outputs the signal $S_B$ for forcibly and rapidly raise the command current $I_P$ by a second variable (e.g., fifteen degrees (15°)), which is greater than the first variable, so as to fluctuate the phase of the command current $I_P$ relative to the timing voltage signal $V_P$, to the PLL circuit 51 from the output port 570 of the D/A converter 57. In this case, in a case where no power outage occurs at the alternating current commercial power source 43, changes in frequency of the timing voltage signal $V_P$ fall within a threshold value used for the frequency and are relatively small. Furthermore, in this case, the phase difference of the command current $I_P$ relative to the timing voltage signal $V_P$ falls within the range of the threshold value used for the phase difference and is relatively small. Accordingly, the control portion 50 of the control device 5 determines that there is no possibility of the power outage occurring at the alternating current commercial power source 43. In a case where the alternating current commercial power source 43 fails while the induction motor 46 is rotatably driven, the induction motor 46 continues to rotate by its inertia so as to function as an induction generator although the alternating current commercial power source 43 fails, which may result in applying the voltage to the alternating current commercial power source 43. Accordingly, fluctuation in the frequency of the timing voltage signal $V_P$ may not occur.

In the embodiments, in a case where the second variable is greater and where the alternating current commercial power source 43 fails, the changes in the frequency of the timing voltage signal $V_P$ follow a degree (a level) of the second variable, so that the changes in the frequency of the timing voltage signal $V_P$ fall outside of the range of the threshold value used for the frequency. Furthermore, in the case where the power outage occurs at the alternating current commercial power source 43, the PLL circuit 51 generates a relatively great fluctuation in the frequency of the timing voltage signal $V_P$, because the PLL circuit 51 is configured so that the frequency of the command current $I_P$ outputted from the output port 513 increases in the case of the power outage. The fluctuation of the frequency is set to have a degree so as to overcome the inertia of the induction motor 46. Furthermore, while the power outage occurs at the alternating current commercial power source 43, the phase difference of the command current $I_P$ relative to the timing voltage signal $V_P$ follows the degree of the second variable so as to fall outside of the threshold value used for the phase difference.

Accordingly, in the case where the frequency of the timing voltage signal $V_P$ falls outside of the threshold value used for the frequency and further, in the case where the phase difference falls outside of the threshold value used for the phase difference, the control portion 50 of the control device 5 conclusively determines that the alternating current commercial power source 43 fails. According to the first embodiment, in the case where the inverter device 3 is actuated while being interconnected to the alternating current commercial power source 43 as described above, the control portion 50 of the control device 5 inputs the signal $S_C$ for generating the phase difference of three degrees at the phase of the command current 1p relative to the timing voltage signal $V_P$ (by the first variable) in a predetermined cycle into the second input port 512 of the PLL circuit 51 from the D/A converter 57 at the predetermined cycle ($\Delta t1$, $\Delta t2$). Furthermore, the control portion 50 detects the phase difference between the command current $I_P$ and the timing voltage signal $V_P$, so that the control portion 50 determines that the alternating current commercial power source 43 does not fail in the case where the phase difference corresponds to three degrees. Accordingly, the control portion 50 temporarily and periodically ($\Delta t1$, $\Delta t2$) determines the possibility of the power outage of the alternating current commercial power source 43. In a case where the power outage actually occurs at the alternating current commercial power source 43, the phase difference of the command current $I_P$ relative to the timing voltage signal $V_P$ does not correspond to three degrees (3°) because the voltage of the alternating current commercial power source 43 is lost when the power outage occurs at the alternating current commercial power source 43. Therefore, the control portion 50 of the control device 5 inputs the signal $S_C$ for generating the phase difference of fifteen degrees (15°) at the command current $I_P$ relative to the timing voltage signal $V_P$ (by the second variable) into the second input port 512 of the PLL circuit 51 from the output port 570 of the D/A converter 57 at the timing when the power outage occurs at the alternating current commercial power source 43 as a trigger. Accordingly, the reactive power increases, so that a balance between the output and the load is lost and the direct current intermediate voltage $V_m$ fluctuates, which results in greatly fluctuating the command current $I_P$ relative to the timing voltage signal $V_P$. As a result, a voltage root means square value (i.e. a voltage RMS value) of the timing voltage signal $V_P$ also fluctuates and the phase of the command current $I_P$ relative to the timing voltage signal $V_P$ greatly changes. Therefore, in a case where the voltage RMS value of the timing voltage signal $V_P$ falls outside of the range of the threshold value and where the phase difference of the command current $I_P$ relative to the timing voltage signal $V_P$ falls outside of the range of the threshold value used for the phase difference, the control device 5 conclusively determines that the power outage occurs at the alternating current commercial power source 43.

The PLL circuit 51 is configured so that the frequency of the current outputted from the output port 513 of the PLL circuit 51 automatically increases in the case that the power outage occurs at the alternating current commercial power source 43. Therefore, in a case where the frequency of the timing voltage signal $V_P$ falls outside of the range of the threshold value used for the frequency, the control device 5 conclusively determines that the power outage occurs at the alternating current commercial power source 43. Accordingly, a determination accuracy of the occurrence of the power outage of the alternating current commercial power source 43 is increased.

Even in the case where the command current $I_P$ is displaced by fifteen degrees (by the second variable) relative to the timing voltage signal $V_P$, the control device 5 determines that the power outage does not occur at the alternating current commercial power source 43 if the fluctuation of the timing voltage signal $V_P$ falls within the range of the threshold value used for the phase difference. Accordingly, a misdetermination of the power outage of the alternating current commercial power source 43 is avoided.

Figure 6:
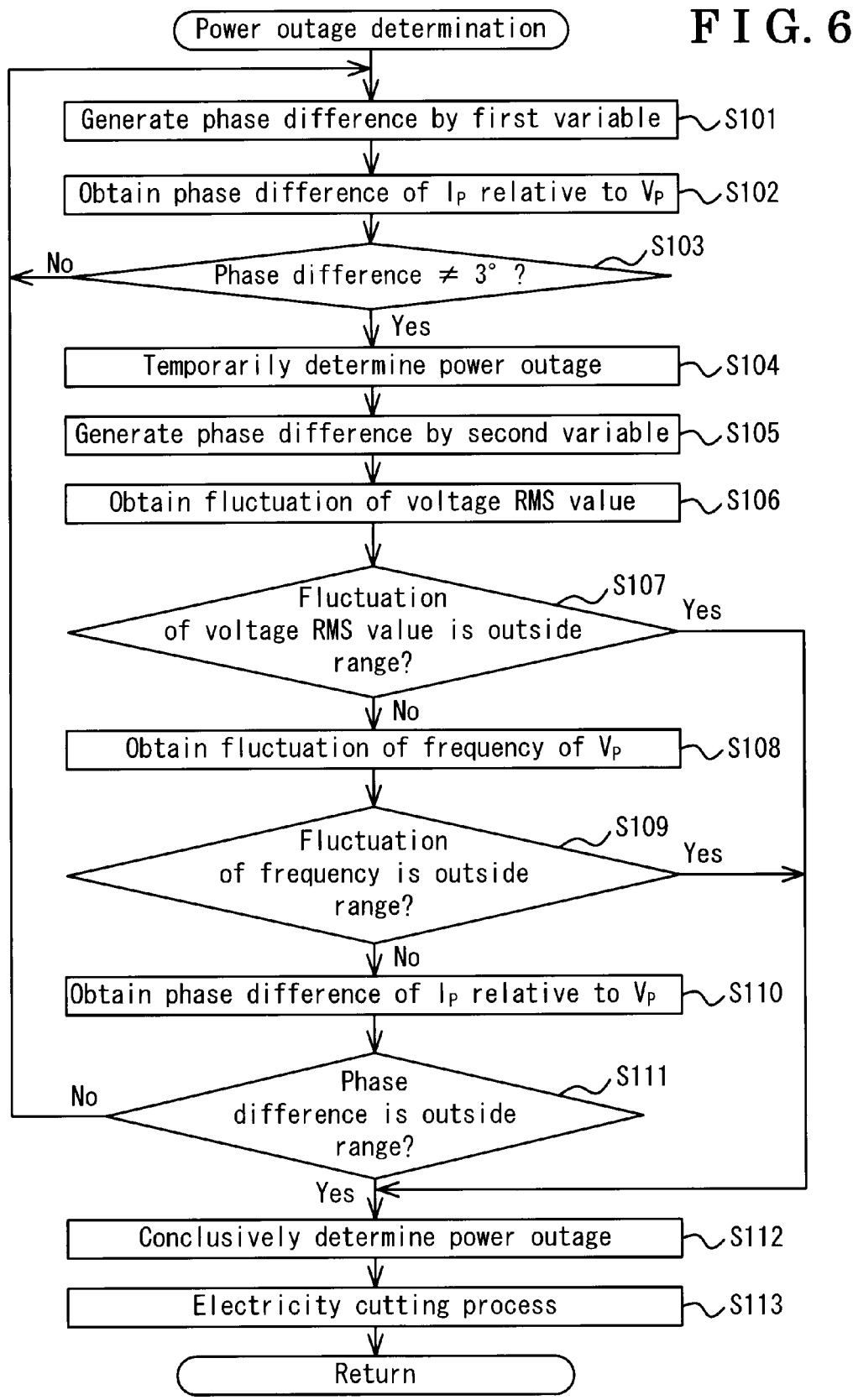
FIG. 6 is a flowchart illustrating a process executed by a control portion according to the embodiments disclosed here.

A detailed process executed by the control portion 50 of the control device 5 will be described below with reference to FIG. 6. The process executed by the control portion 50 of the control device 5 shown in FIG. 6 is applicable to the first and second embodiments. When the temperature drift is generated at the first electric current sensor 59 and the second electric current sensor 39, the temperature drift influences on both of the first integrated value and the second integrated value. Thus, even when the temperature drift is generated at the first electric current sensor 59 and the second electric current sensor 39, the temperature drift is substantially canceled. Accordingly, the direct current component included in the load alternating current im of the load alternating current power Wm converted at the second converter 35 of the inverter device 3 is favorably detected. This allows that a sensor which generates the temperature drift is applied as the first electric current sensor 59 and the second electric current sensor 39, which contributes to a cost reduction.

According to the embodiments, a power outage of the alternating current commercial power source 43 during the inverter device 3 is in operation is detected. As illustrated in FIG. 6, in a case where the inverter device 3 is actuated so as to generate a predetermined output while being interconnected to the alternating current commercial power source 43, the control portion 50 of the control device 5 executes a process of inputting the signal $S_C$ for displacing the command current $I_P$ by three degrees (3°) (by the first variable) relative to the timing voltage signal $V_P$ in the predetermined cycle into the second input port 512 of the PLL circuit 51 from the output port 570 of the D/A converter 57 (step S101). Then, the control portion 50 obtains the phase difference of the command current $I_P$ relative to the timing voltage signal $V_P$ (step S102). In the case where the phase difference corresponding to three degrees (3°) is obtained (No in step S103), the control device 5 temporarily determines that the commercial power supply 43 is in the normal state and the power outage does not occur at the alternating current commercial power source 43. Then, the process returns to step S101. In the case where the power outage occurs at the alternating current commercial power source 43, the phase difference of the command current $I_P$ relative to the timing voltage signal $V_P$ does not correspond to three degrees (3°) (Yes in step S103). Therefore, in this case, the control portion 50 temporarily determines that the power outage occurs at the alternating current commercial power source 43 (step S104).

Using the temporal determination as the trigger, the control portion 50 of the control device 5 executes a process of inputting the signal $S_C$ for displacing the command current $I_P$ so as by fifteen degrees (15°) (by the second variable) relative to the timing voltage signal $V_P$ into the second input port 512 of the PLL circuit 52 from the output port 570 of the D/A converter 57 (step S105). Accordingly, the reactive power increases, which results in losing the balance between the output and the load. In this case, the direct current intermediate voltage $V_m$ fluctuates and the timing and fluctuation in a waveform of each of the timing voltage signal $V_P$ and the command current $I_P$ increase. As a result, the voltage RMS value of the timing voltage signal $V_P$ also fluctuates. Furthermore, the phase of the command current $I_P$ relative to the timing voltage signal $V_P$ also greatly changes. Therefore, the control portion 50 obtains the changes (the fluctuation) of the voltage RMS value of the timing voltage signal $V_P$ (step S106). In the case where the fluctuation of the voltage RMS value of the timing voltage signal $V_P$ falls outside of the range of the threshold value (Yes in step S107), the control portion 50 conclusively determines that the power outage occurs at the alternating current commercial power source 43 (step S112). Furthermore, the control device 5 executes a process of breaking electricity to the alternating current commercial power source 43, such as cutting the interconnection between the alternating current commercial power source 43 and the inverter device 3 (step S113).

The PLL circuit 51 is configured so that the frequency of the command current $I_P$ outputted from the output port 513 of the PLL circuit 51 automatically increases in the case where the power outage actually occurs at the alternating current commercial power source 43. Accordingly, in the embodiments, the control portion 50 obtains the fluctuation of the frequency of the timing voltage signal $V_P$ (step S108) even in the case where the voltage RMS value of the timing voltage signal $V_P$ falls within the range of the threshold value used for the voltage RMS value (No in step S107), in order to increase accuracy in the detection of the occurrence of the power outage at the alternating current commercial power source 43. In the case where the fluctuation of the frequency falls outside of the range of the threshold value used for the frequency (Yes in step S109), the control device 5 conclusively determines that the power outage occurs at the alternating current commercial power source 43 (step S112) and then executes the process of cutting the electricity to the alternating current commercial power source 43 (step S113).

The control portion 50 obtains the phase difference of the command current $I_P$ relative to the timing voltage signal $V_P$ (step S110) even in the case where the fluctuation of the frequency falls within the range of the threshold value used for the frequency (No in step S109). In the case where the phase difference falls outside of the range of the threshold value (Yes in step S111), the control portion 50 conclusively determines that the power outage occurs at the alternating current commercial power source 43 (step S112). Then, the control portion 50 executes the process of breaking the electricity to the alternating current commercial power source 43 such as cutting the interconnection between the alternating current commercial power source 43 and the inverter device 3 (step S113). On the other hand, in the case where the fluctuation of the frequency falls within the range of the threshold value use for the frequency (No in step S109) and where the phase difference of the command current $I_P$ relative to the timing voltage signal $V_P$ falls within the range of the threshold value (No in step S111), the control portion 50 determines that the power outage does not occur at the alternating current commercial power source 43 and the process returns to step S101.

According to the embodiment, in the case where the possibility of the power outage at the alternating current commercial power source 43 is temporarily determined to be high, the control portion 50 generates the phase difference (by the second variable) between the command current $I_P$ and the timing voltage signal $V_P$ and then, the control portion 50 determines whether or not the power outage occurs at the alternating current commercial power source 43 on the basis of plural parameters. Accordingly, the misdetermination of the power outage at the alternating current commercial power source 43 may be restrained. Any selective desired values, by which the possibility of the power outage at the commercial power supply 43 is determined on the basis of an actuating state of each of the inverter device 3 and the alternating current commercial power source 43 and the like, may be adapted as the threshold value of each parameter. According to the embodiments, in the case where the phase difference is generated on the basis of the second variable, the voltage RMS value of the timing voltage signal $V_P$, the fluctuation of the frequency of the timing voltage signal $V_P$ and the phase difference of the command current $I_P$ relative to the timing voltage signal $V_P$ are obtained in the above-mentioned order. However, the power generating system according to the embodiments may be modified so that the fluctuation of the frequency of the timing voltage signal $V_P$, the voltage RMS value of the timing voltage signal $V_P$, the phase difference of the command current $I_P$ relative to the timing voltage signal $V_P$, the fluctuation of the frequency of the timing voltage signal $V_P$ and the voltage RMS value of the timing voltage signal $V_P$ may be obtained in the above-mentioned order.

In the above-mentioned embodiments, the first variable is set to generate the phase difference φ1 of three degrees (3°) between the command current $I_P$ and the timing voltage signal $V_P$ and the second variable is set to generate the phase difference φ1 of fifteen degrees (15°) between the command current $I_P$ and the timing voltage signal $V_P$. However, the first variable may be set to generate a phase difference φ1 which falls within a range between, for example, two to seven degrees (2° to 7°), between the command current $I_P$ and the timing voltage signal $V_P$ and the second variable may be set to generate a phase difference φ2 in a range between, for example, ten to twenty degrees (10° to 20°). In a case where the second variable is set to be excessively great, a strain of the timing voltage signal VP may become unfavorably excessive. Therefore, a value obtained by dividing the second variable by the first variable (φ2/φ1) may be set to wall within a range between 2.5 to 7 or between 3 to 6. The power generating system according to this disclosure is not limited to the above-described embodiments and drawings. The power generating system according to this disclosure may be changed or modified without departing from the spirit and scope of this disclosure.

According to the embodiments, the power generating system includes the engine 1 driven by a fuel, the generator 2 actuated by the engine 1, the inverter device 3 including the first converter 30 converting the alternating current power generated by the generator 2 into the direct current power, the second converter 35 converting the direct current converted by the first converter 30 into the load alternating current power and being interconnected with the alternating current commercial power source 43, and the gate drive circuit 40 controlling the switching of the second converter 35. The power generating system further includes the control device 5 including the control portion 50 having the central processing unit and controlling the inverter device 3, the first current sensor 59 provided at the second converter 35 of the inverter device at a side closer to the load, the first current sensor 59 detecting the load alternating electric current of the load alternating current power converted by the second converter 35, and the second current sensor 39 provided between the first converter 30 and second converter 35 of the inverter device 3, the second current sensor 39 detecting the direct current of the direct current power converted by the first converter 30. The control device 5 obtains the first integrated value M1$f$, M1$s$ which is calculated by integrating the (a) direct current component corresponding to a positive electric current positioned at a positive side relative to a zero-crossing of the load alternating electric current among the direct current of the direct current power converted by the first converter 30 detected by the second current sensor 39 by time, obtains the second integrated value M2$f$, M2$s$ which is calculated by integrating a direct current component corresponding to a negative electric current positioned at a negative side relative to the zero-crossing of the load alternating electric current, and detects a direct current component included in the load alternating electric current of the load alternating current power converted by the second converter 35 on the basis of a degree of a difference between the first integrated value and the second integrated value.

According to the embodiments, first current sensor 59 (the first current detection device) is provided at the second converter of the inverter device at a side closer to the load, and detects the load alternating current of the load alternating power converted by the second converter 35 of the inverter device 3. The second current sensor 39 (the second current detection device) is provided between the first converter 30 and the second converter 35 to detect the direct current component of the direct current power converted by the first converter 30. The control device 5 obtains the first integrated value M1$f$, M1$s$ which is calculated by integrating the direct current component corresponding to the positive electric current positioned at the positive side relative to the zero-crossing of the load alternating electric current among the direct current component detected by the second current sensor 39 by time. The control device 5 further obtains the second integrated value M2$f$, M2$s$ which is calculated by integrating the direct current component corresponding to the negative electric current positioned at the negative side relative to the zero-crossing of the load alternating electric current among the direct current detected by the second current sensor 39 by time. The control device 5 detects the direct current component included in the load alternating current of the load alternating power converted by the second converter 35 on the basis of the degree of the difference between the first integrated value M1f, M1s and the second integrated value M2f, M2s. In those circumstances, when the temperature drift is generated at the first current sensor 59 and the second current sensor 39, the temperature drift influences on both of the first integrated value M1f, M1s and the second integrated value M2f, M2s. Thus, even when an error based on the temperature drift is generated at the first current sensor 59 and the second current sensor 39, the temperature drift is substantially cancelled at the difference, and the error based on the temperature drift is substantially cancelled. Accordingly, the direct current component included in the load alternating current of the load alternating power converted by the second converter 35 is favorably detected. The temperature drift defines that the precision in detection of the electric current declines due to the temperature. According to the construction of the embodiments, a current sensor which generates the temperature drift is applicable as the first current sensor 59 and the second current sensor 39.

According to the construction of the embodiments, when the load alternating current power converted by the second converter 35 of the inverter device 3 is outputted to the load, the control device 5 detects the direct current component included in the load alternating current of the load alternating current power converted by the second converter 35 on the basis of the degree of the difference between the first integrated value M1f, M1s and the second integrated value M2f, M2s. In those circumstances, even when the first current sensor 59 and the second current sensor 39 are likely to be influenced by the temperature drift, the direct current component included in the load alternating current of the load alternating current power converted by the second converter is favorably detected.

According to the embodiments, the power generating system includes the transformer 48. The control portion 5 adds a voltage signal based on the difference between the first integrated value M1f, M1s and the second integrated value M2f, M2s for multiple times during a cycle of a timing voltage signal Vp when the timing voltage signal Vp is defined as an alternating current voltage signal inputted to the control portion 50 of the control device 5 via the transformer 48 and is synchronized with the load alternating current power converted by the second converter 35 of the inverter device 3.

Further, according to the embodiments, the load includes the indoor electric power load 47 which is connected to an output of the alternating current commercial power source 43 and an output of the inverter 3.

Still further, according to the embodiments, the indoor electric power load 47 includes the induction motor 46.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. A power generating system, comprising:
an engine driven by a fuel;
a generator actuated by the engine;
an inverter device including a first converter converting an alternating current power generated by the generator into a direct current power, a second converter converting the direct current converted by the first converter into a load alternating current power and being interconnected with an alternating current commercial power source, and a gate drive circuit controlling a switching of the second converter;
a control device including a control portion having a central processing unit and controlling the inverter device;
a first current detection device provided at the second converter of the inverter device at a side closer to a load, the first current detection device detecting a load alternating electric current of the load alternating current power converted by the second converter;
a second current detection device provided between the first converter and the second converter of the inverter device, the second current detection device detecting a direct current of the direct current power converted by the first converter; and
a transformer; wherein
the control device obtains a first integrated value which is calculated by integrating a direct current component corresponding to a positive electric current positioned at a positive side relative to a zero-crossing of the load alternating electric current among the direct current of the direct current power converted by the first converter and detected by the second current detection device by time, obtains a second integrated value which is calculated by integrating a direct current component corresponding to a negative electric current positioned at a negative side relative to the zero-crossing of the load alternating electric current among the direct current detected by the second current detection device by time, and detects a direct current component included in the load alternating electric current of the load alternating current power converted by the second converter on the basis of a degree of a difference between the first integrated value and the second integrated value, and
the control portion adds a voltage signal based on the difference between the first integrated value and the second integrated value for multiple times during a cycle of a timing voltage signal when the timing voltage signal is defined as an alternating current voltage signal inputted to the control portion of the control device via the transformer and is synchronized with the load alternating current power converted by the second converter of the inverter device.
2. The power generating system according to claim 1, wherein
the load includes an indoor electric power load which is connected to an output of the alternating current commercial power source and an output of the inverter.
3. The power generating system according to claim 2, wherein the indoor electric power load includes an induction motor.

* * * * *